(12) United States Patent
Rieder et al.

(10) Patent No.: US 11,073,499 B2
(45) Date of Patent: Jul. 27, 2021

(54) MEASURING TRANSDUCER OF VIBRATION-TYPE

(71) Applicant: Endress+Hauser Flowtec AG, Reinach (CH)

(72) Inventors: Alfred Rieder, Landshut (DE); Gerhard Eckert, Grenzach-Wyhlen (DE); Ennio Bitto, Aesch (CH); Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 325 days.

(21) Appl. No.: 16/302,769

(22) PCT Filed: Apr. 17, 2017

(86) PCT No.: PCT/EP2017/060076
§ 371 (c)(1),
(2) Date: Nov. 19, 2018

(87) PCT Pub. No.: WO2017/198439
PCT Pub. Date: Nov. 23, 2017

(65) Prior Publication Data
US 2019/0162702 A1 May 30, 2019

(30) Foreign Application Priority Data
May 19, 2016 (DE) ............ 10 2016 109 251.7

(51) Int. Cl.
*G01F 1/84* (2006.01)
*G01N 29/22* (2006.01)
(Continued)

(52) U.S. Cl.
CPC ......... *G01N 29/222* (2013.01); *G01F 1/8409* (2013.01); *G01F 1/8413* (2013.01);
(Continued)

(58) Field of Classification Search
CPC .... G01F 1/8477; G01F 1/8422; G01F 1/8409; G01F 1/8413; G01F 1/8472; G01F 1/8431
See application file for complete search history.

(56) References Cited

U.S. PATENT DOCUMENTS

| | | | |
|---|---|---|---|
| 2001/0035055 A1* | 11/2001 | Drahm | G01F 1/8413 73/861.355 |
| 2002/0144557 A1* | 10/2002 | Drahm | G01F 1/8413 73/861.355 |

(Continued)

FOREIGN PATENT DOCUMENTS

| | | |
|---|---|---|
| CN | 102016522 A | 4/2011 |
| CN | 102472653 A | 5/2012 |

(Continued)

OTHER PUBLICATIONS

Search Report for German Patent Application No. 10 2016 109 251.7, German Patent Office, dated Jan. 1, 2017, 6 pp.

(Continued)

*Primary Examiner* — Alexander A Mercado
(74) *Attorney, Agent, or Firm* — Kelly J. Smith; Endress+Hauser (USA) Holding Inc.

(57) ABSTRACT

A measuring transducer includes a support body, a curved oscillatable measuring tube, an electrodynamic exciter, at least one sensor for registering oscillations of the measuring tube, and an operating circuit. The measuring tube has first and second bending oscillation modes, which are mirror symmetric to a measuring tube transverse plane and have first and second media density dependent eigenfrequencies f1, f3 with f3>f1. The measuring tube has a peak secant with an oscillation node in the second mirror symmetric bending oscillation mode. The operating circuit is adapted to drive the exciter conductor loop with a signal exciting the second (Continued)

mirror symmetric bending oscillation mode. The exciter conductor loop has an ohmic resistance $R_\Omega$ and a mode dependent mutual induction reactance $R_{g3}$ which depends on the position of the exciter. The exciter is so positioned that a dimensionless power factor $$pc_3 = \frac{4 \cdot R_\Omega \cdot R_{g3}}{(R_\Omega + R_{g3})^2}$$

has a value of not less than 0.2.

19 Claims, 4 Drawing Sheets

(51) Int. Cl.
  G01N 9/00 (2006.01)
  G01N 29/02 (2006.01)
(52) U.S. Cl.
  CPC .......... G01F 1/8422 (2013.01); G01F 1/8472 (2013.01); G01F 1/8477 (2013.01); G01N 9/002 (2013.01); G01N 29/02 (2013.01); *G01N 2291/014* (2013.01); *G01N 2291/02818* (2013.01); *G01N 2291/02836* (2013.01)

(56) References Cited

U.S. PATENT DOCUMENTS

| | | |
|---|---|---|
| 2011/0036179 A1 | 2/2011 | Weinstein |
| 2012/0096950 A1* | 4/2012 | Wada .................. G01F 1/8436 |
| | | 73/861.356 |
| 2012/0167697 A1* | 7/2012 | Rieder .................. G01F 1/8413 |
| | | 73/861.357 |
| 2014/0238140 A1 | 8/2014 | Larsen et al. |

FOREIGN PATENT DOCUMENTS

| | | |
|---|---|---|
| CN | 103534558 A | 1/2014 |
| CN | 105008871 A | 10/2015 |
| DE | 102015112737 A1 | 2/2017 |
| DE | 102015122661 A1 | 6/2017 |
| EP | 1130367 A1 | 9/2001 |
| EP | 1296119 A1 | 3/2003 |
| EP | 1729099 A1 | 12/2006 |

OTHER PUBLICATIONS

Search Report for International Patent Application No. PCT/EP2017/060076, WIPO, dated Jul. 20, 2017, 14 pp.

* cited by examiner

MEASURING TRANSDUCER OF VIBRATION-TYPE

CROSS-REFERENCE TO RELATED APPLICATIONS

The present application is related to and claims the priority benefit of German Patent Application No. 10 2016 109 251.7, filed on May 19, 2016 and International Patent Application No. PCT/EP2017/060076 filed on May 19, 2016, the entire contents of which are incorporated herein by reference.

TECHNICAL FIELD

The present invention relates to a measuring transducer of vibration-type, especially for measuring mass flow and/or density of a medium. Such measuring transducers comprise, usually, at least one oscillatable measuring tube, especially at least one pair of oscillatable measuring tubes.

BACKGROUND

Ordinarily, oscillations in the so-called f1 mode are excited, whose eigenfrequency is density dependent, so that a determining of density is enabled. Superimposed on the oscillation in the f1 mode is a flow dependent oscillation in the Coriolis mode, the so-called f2 mode, whose quantification enables a determining of the mass flow. For exciting the oscillations, the measuring transducers have, usually, an electrodynamic exciter, which exerts a periodic, transverse force on the measuring tube. Especially in the case of measuring transducers with measuring tubes curved in the resting position, the electrodynamic exciter is, usually, arranged near the peak of the measuring tube curve on its inner side.

Mentioned in as yet unpublished patent applications DE 10 2015 122 661 and DE 10 2015 112 737 is that the accuracy of the density measurement and the flow measurement can be significantly increased, when besides the eigenfrequency of the f1 mode also the eigenfrequency of the f3 mode is taken into consideration. This relates especially to measurements of gases or multiphase compressible media, for example, media with gas load, especially in the form of microbubbles. Thus, it can be beneficial to excite not only the f1 mode but also the f3 mode.

Investigations in connection with the present invention have shown that the f3 mode has near the peak of the measuring tube curve on its inner side a node plane, which makes an effective exciting of the f3 mode difficult.

SUMMARY

It is, therefore, an object of the present invention to provide a measuring transducer of vibration-type, which enables an effective exciting of the f3 mode.

The measuring transducer of the invention of vibration-type includes: a support body; at least one curved measuring tube serving for guiding a fluid and having an inlet side end section and an outlet side end section, wherein the measuring tube is held by the support body at the inlet side end section and at the outlet side end section, wherein the measuring tube has a freely oscillatable section; an operating circuit; an electrodynamic exciter in an exciter conductor loop for exciting bending oscillations of the measuring tube; wherein a measuring tube longitudinal plane is defined as a plane, in which an integral along a measuring tube centerline of the oscillatable section of the squares of the separations between the measuring tube centerline in the resting position of the measuring tube and the plane has a minimum, wherein a measuring tube transverse plane is defined, with respect to which the measuring tube is mirror symmetric, wherein the measuring tube transverse plane extends perpendicularly to the measuring tube longitudinal plane; wherein the measuring tube has a first bending oscillation mode, which is mirror symmetric to the measuring tube transverse plane and which has a first eigenfrequency f1, which depends on the density of a medium guided through the measuring tube, wherein the measuring tube has a second bending oscillation mode, which is mirror symmetric to the measuring tube transverse plane and which has a second eigenfrequency f3, which depends on the density of the medium guided through the measuring tube, wherein the second eigenfrequency is greater than the first eigenfrequency f1, wherein the measuring tube has a peak secant, which intersects points of the outer surface of the measuring tube wall, which in the resting position of the measuring tube lie on the line of intersection between the measuring tube longitudinal plane and the measuring tube transverse plane, wherein the peak secant has an oscillation node, when the measuring tube oscillates in the second mirror symmetric bending oscillation mode, wherein the exciter conductor loop has an ohmic resistance $R_\Omega$, wherein the operating circuit is adapted to drive the exciter conductor loop with a signal for exciting the second mirror symmetric bending oscillation mode, wherein the exciter conductor loop further has, dependent on the oscillatory mode, a mutual induction reactance $R_{g3}$, which depends on the position of the exciter; wherein the exciter is so positioned that a dimensionless power factor $$pc_3 = \frac{4 \cdot R_\Omega \cdot R_{g3}}{(R_\Omega + R_{g3})^2}$$

has a value, which is not less than 0.2, especially not less than 0.5 and especially preferably not less than 0.8, when the measuring tube is filled with water and is excited by the electrodynamic exciter with the eigenfrequency of the second mirror symmetric bending oscillation mode to execute bending oscillations at 300 K.

Two factors concerning the mutual induction reactance lead to the above condition. On the one hand, the relative velocity between the coil of the electrodynamic exciter and its magnet effects a mutual induced voltage, which is a measure for the exciting of a bending oscillation mode. On the other hand, this mutual induced voltage opposes an exciter voltage in the exciter conductor loop, so that it limits the exciter current. These two factors enter into the above power factor, which assumes values between zero and one, and is maximum, when the mutual induction reactance equals the ohmic resistance.

Since the relative velocity between the coil of the electrodynamic exciter and its magnet is proportional to the mode specific oscillation amplitude Xi of the i-th bending oscillation mode at the site of the exciter, the mutual induction reactance can be controlled via the positioning of the exciter. The selection of a site of maximum oscillation amplitude as exciter position of the measuring tube is, in given cases, to be avoided, for, especially in the case of higher modes, for example, the f3 mode, such large velocities can occur there that the mutual induction reactance significantly exceeds the ohmic resistance of the exciter conductor loop. In this case, the desired mode can no longer be effectively excited. Therefore, the invention proposes to take the effectiveness of the exciting of higher modes into consideration for positioning the electrodynamic exciter.

The above mentioned test conditions of a filling of the measuring tube with water at 300 K present no limitations for the field of application of the measuring transducer of the invention, especially not for the temperature use range or the media. Since, however, the mutual induction reactance depends on the quality and the eigenfrequency of the measuring tube in the considered oscillatory mode, into which media properties enter, it is helpful for clarity to define the test conditions.

In a further development of the invention, the oscillation node of the peak secant in the second mirror symmetric bending oscillation mode defines a node plane, which extends perpendicularly to the measuring tube transverse plane and perpendicularly to the measuring tube longitudinal plane, wherein the peak secant has no oscillation nodes in the node plane, when the measuring tube oscillates in the first mirror symmetric bending oscillation mode.

In a further development, the measuring tube has an outer diameter do in the measuring tube transverse plane, wherein the node plane is spaced from the intersection between the measuring tube centerline and the measuring tube transverse plane by no more than three outer diameters, especially no more than two outer diameters.

In a further development of the invention, a peak plane, which extends perpendicularly to the measuring tube transverse plane and perpendicularly to the measuring tube longitudinal plane and through the intersection between the measuring tube centerline and the measuring tube transverse plane, extends between the node plane and the exciter.

In a further development of the invention, the exciter is spaced from the peak plane by no more than two outer diameters of the measuring tube, especially no more than one outer diameter.

In a further development of the invention, the operating circuit is adapted to drive the exciter conductor loop with a signal for exciting the first mirror symmetric bending oscillation mode.

In a further development of the invention, the exciter conductor loop has a mutual induction reactance $R_{g1}$ dependent on the first symmetric bending oscillation mode, which mutual induction reactance $R_{g1}$ depends on the position of the exciter; wherein the exciter is so positioned that the dimensionless power factor $pc_1$, $$pc_1 = \frac{4 \cdot R_\Omega \cdot R_{g1}}{(R_\Omega + R_{g1})^2}$$

has a value, which is not less than 0.3, especially not less than 0.6 and especially preferably not less than 0.8, when the measuring tube is filled with water and excited by the electrodynamic exciter with the eigenfrequency of the first mirror symmetric bending oscillation mode to execute bending oscillations at 300 K.

In a further development of the invention, a total power factor $pc_{1,3}$ is given by the expression:

$$pc_{1,3} = pc_1 \cdot pc_3$$

wherein $pc_{1,3}$ is not less than 0.2, especially not less than 0.4 and especially preferably not less than 0.7.

In a further development of the invention, the ohmic resistance $R_\Omega$ is at least 90% caused by a coil or a plurality of coils of the exciter and, in given cases, a limiting resistance, or a plurality of limiting resistances, especially for meeting ignition protection type Ex-i in the conductor loop.

In a further development of the invention, the measuring transducer comprises at least one pair of measuring tubes having a shared measuring tube transverse plane, wherein the electrodynamic exciter is adapted to excite oscillation of the measuring tubes relative to one another. In an embodiment of this further development of the invention, the measuring tubes have parallel measuring tube longitudinal planes.

In a further development of the invention, the measuring transducer further includes at least one sensor for registering oscillations of the measuring tube, or of the measuring tubes relative to one another, especially a pair of sensors, which are arranged symmetrically to the measuring tube transverse plane.

For a concrete design of a measuring transducer of the invention, especially as regards the position of the exciter, the oscillatory behavior of the measuring tube, or of the measuring tubes, of the measuring transducer can be analyzed, for example, by modeling with finite elements and/or using experimental arrangements. In this way, the oscillation nodes of the second mirror symmetric bending oscillation mode, thus of the f3 mode, can be identified, which define a node plane, from which the exciter must be spaced, or separated, since an exciting of the f3 mode in or near the node plane is not practical, or is inefficient. On the other hand, it is to be taken into consideration that the deflection of the measuring tube in the f3 mode can grow exponentially with separation from the node plane, such that the separation should be limited. Based on the deflection, the eigenfrequency and the quality of the measuring tube in the considered bending oscillation mode, the mutual induction reactance can be calculated and taken into consideration for ascertaining the power factor. An experimental determining of the mutual induction as a function of the exciter position, or a combination of simulation results and experiments, is equally possible.

BRIEF DESCRIPTION OF THE DRAWING

The invention will now be explained in greater detail based on the example of an embodiment illustrated in the drawing, the figures of which show as follows.

DETAILED DESCRIPTION

Figure 1:
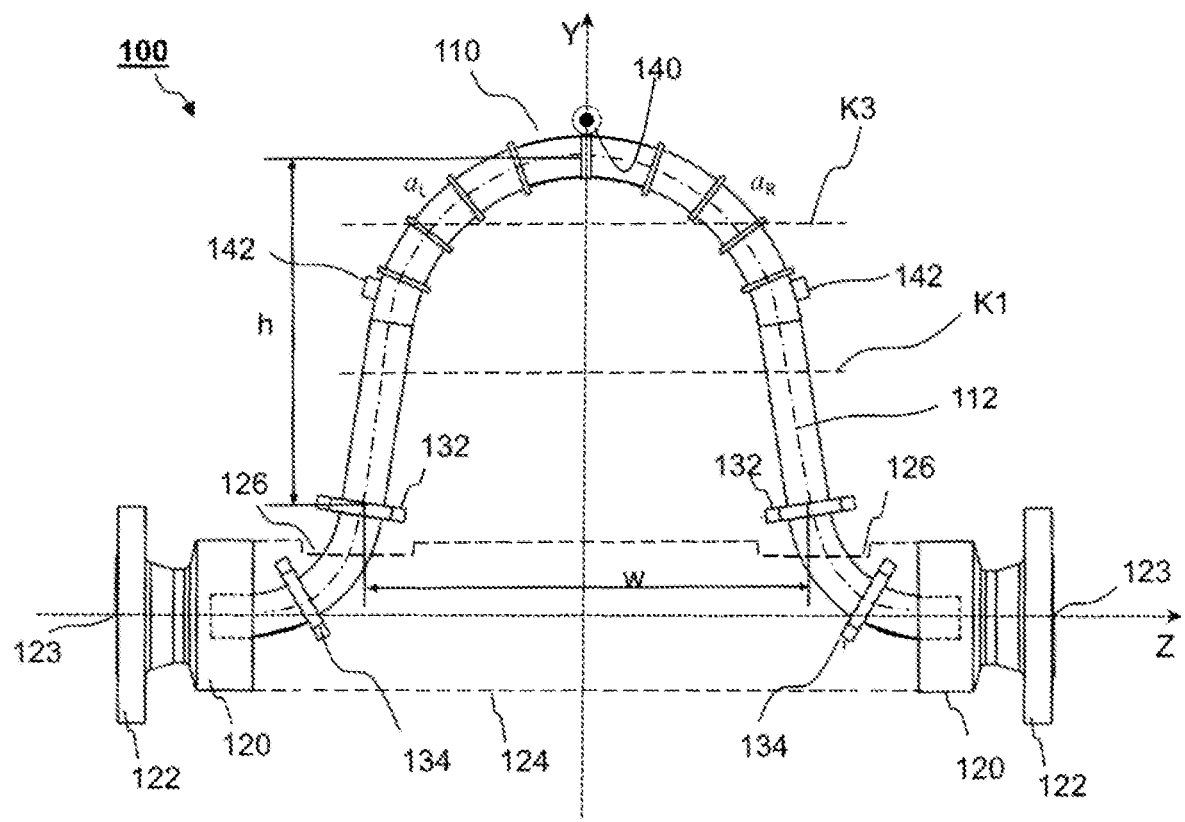
FIG. 1 shows an example of an embodiment of a measuring transducer of the invention.

The example of an embodiment of a measuring transducer 100 of the invention shown in FIG. 1 includes a pair of curved measuring tubes 110. The measuring tubes 110 extend between an inlet end collector 120 and an outlet end collector 120 and are connected with these fixedly, for example, by roll expansion, welding, soldering or brazing. Extending between the collectors 120 is a sturdy support tube 124, which with both collectors are durably connected, whereby the collectors 120 are rigidly coupled together. The support tube 124 has on its upper side openings 126, through which the measuring tubes 110 exit and enter the support tube 124 in the vicinity of the collectors 120.

The collectors 120 have terminal flanges 122, by means of which the Coriolis mass flow measuring device, and/or density measuring device, can be installed in a pipeline. Through central openings 123 in the flanges 122, a mass flow can traverse the measuring tubes 110, so that the mass flow, or its density, can be measured.

Figure 2:
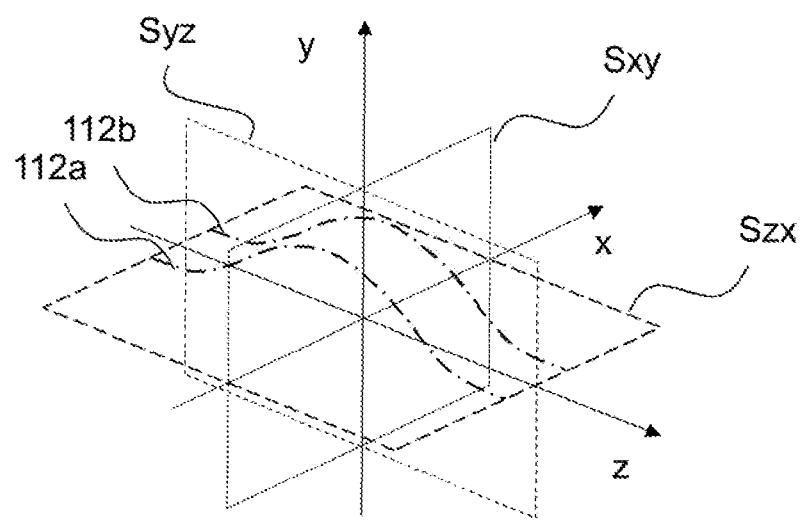
FIG. 2 shows a coordinate system for description of an example of an embodiment of a measuring transducer of the invention.

Based on FIG. 2, some symmetry characteristics of measuring transducers of the invention will now be presented. Shown in this connection are measuring tube central axes 112a, 112b of the two measuring tubes 110, which form the oscillator. The measuring tube central axes 112a, 112b extend symmetrically to a first mirror plane Syz, which extends between the measuring tubes. The measuring tube central axes extend further symmetrically to a second mirror plane Sxy, the so-called measuring tube transverse plane, which extends perpendicularly to the first mirror plane Syz. Lying in the measuring tube transverse plane are peaks of the measuring tubes, and the measuring tube central axes. The measuring tube axes 112a, 112b extend preferably in planes, which extend in parallel with the first mirror plane. No symmetry of the measuring tubes is present relative to a third plane Szx, which extends perpendicularly to the first mirror plane and to the second mirror plane, and in which the measuring tube axes 112a, 112b extend into the collectors. The line of intersection between the first mirror plane Syz and the third plane defines a Z axis of a coordinate system of the measuring transducer. The line of intersection between the second mirror plane Sxy and the third plane Szx defines an X axis of the coordinate system, and the line of intersection between the first mirror plane Syz and the second mirror plane defines the Y axis of the coordinate system. With the coordinates defined in this way, we return to FIG. 1.

The pair of measuring tubes 110 form an oscillator, which has especially a first bending oscillation mode mirror symmetric to the measuring tube transverse plane with a first eigenfrequency f1 and a second bending oscillation mode mirror symmetric to the measuring tube transverse plane with a second eigenfrequency f3, wherein the measuring tubes oscillate in the X direction with opposite phase relative to one another. For exciting the bending oscillation modes of the measuring tubes in the X direction, an electrodynamic exciter mechanism 140 is provided mirror symmetrically to the measuring tube transverse plane. The electrodynamic exciter mechanism 140 includes, for example, a coil on a first measuring tube and an element on the oppositely lying, second measuring tube for plunging into the coil. Details for the vertical positioning of the exciter mechanism in the y direction are explained below.

For registering the oscillations of the measuring tubes, sensor arrangements 142 are provided symmetrically to the measuring tube transverse plane Sxy. The sensor arrangements 142 are embodied, in each case, as inductive arrangements with a coil on one tube and a plunge element on the other tube. Details of this are known to those skilled in the art and need not be explained in further detail here.

For influencing the oscillation characteristics, the measuring tubes 110 are connected at their inlet and outlet ends via couplers 132, 134, wherein the positions of the two inner couplers 132, thus those, which are farthest removed from the nearest collector 120, establish a free oscillatory length of an oscillator formed by the two measuring tubes 110. This free oscillatory length influences the bending oscillation modes of the oscillator, especially their eigenfrequencies, with which the oscillator is preferably excited. Outer couplers 134, which are arranged between the inner node plates 132 and the collectors 120, serve especially to define other oscillation nodes.

The variable h is the arc height of the freely oscillatable measuring tube curve between the two inner couplers 132, wherein the arc height is measured from the intersection of the coupler with the measuring tube centerline to the peak of the measuring tube centerline in the measuring tube transverse plane.

The oscillatory behavior of a measuring tube 110 will now be explained based on FIGS. 3a and 3b.

Figure 3A:
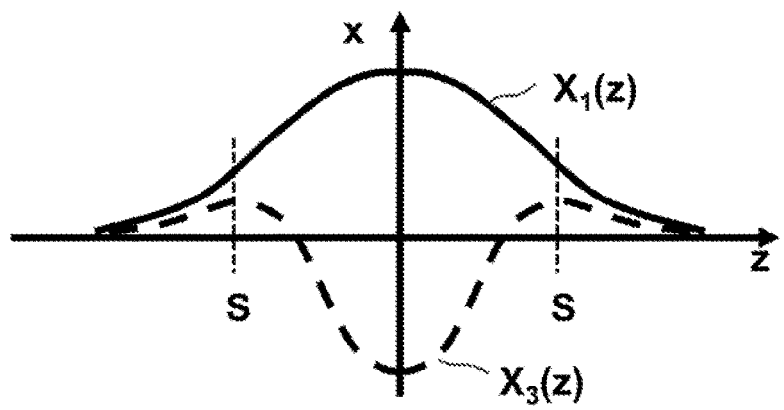
FIG. 3a shows typical deflections of a measuring tube for the f1 mode and the f3 mode in plan view

FIG. 3a shows examples of deflections $X_1(z)$ and $X_3(z)$ along the measuring tube centerline of the first and second mirror symmetric bending oscillation modes orthogonally projected onto the Szx-plane. The Z-coordinate of the sensor arrangements is shown with the lines S. The sensor arrangements are so positioned that they can register the deflections of both bending oscillation modes. The electrodynamic exciter is positioned in the measuring tube transverse plane Sxy, which coincides in this projection with the X axis. The deflection of the sensor arrangements is in a bending oscillation mode proportional to the deflection of the exciter. Thus, an efficient deflection of the exciter leads to an efficient deflection of the sensor arrangements. Starting from this deliberation, an especially optimized exciter position will now be sought.

Figure 3B:
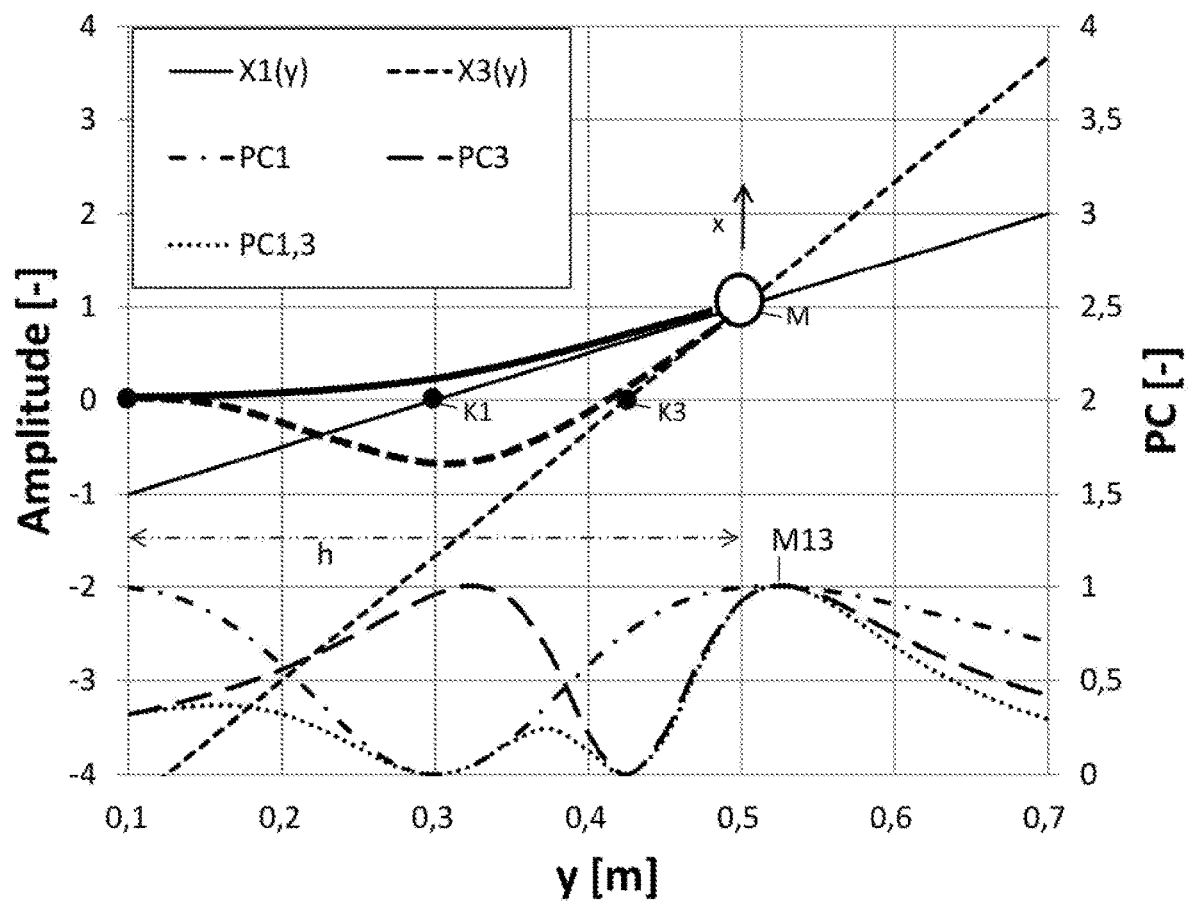
FIG. 3b shows typical deflections for the f1 mode and the f3 mode in orthogonal projection on the measuring tube transverse plane and the associated power factors as well as the product of the power factors.
Figure 5:
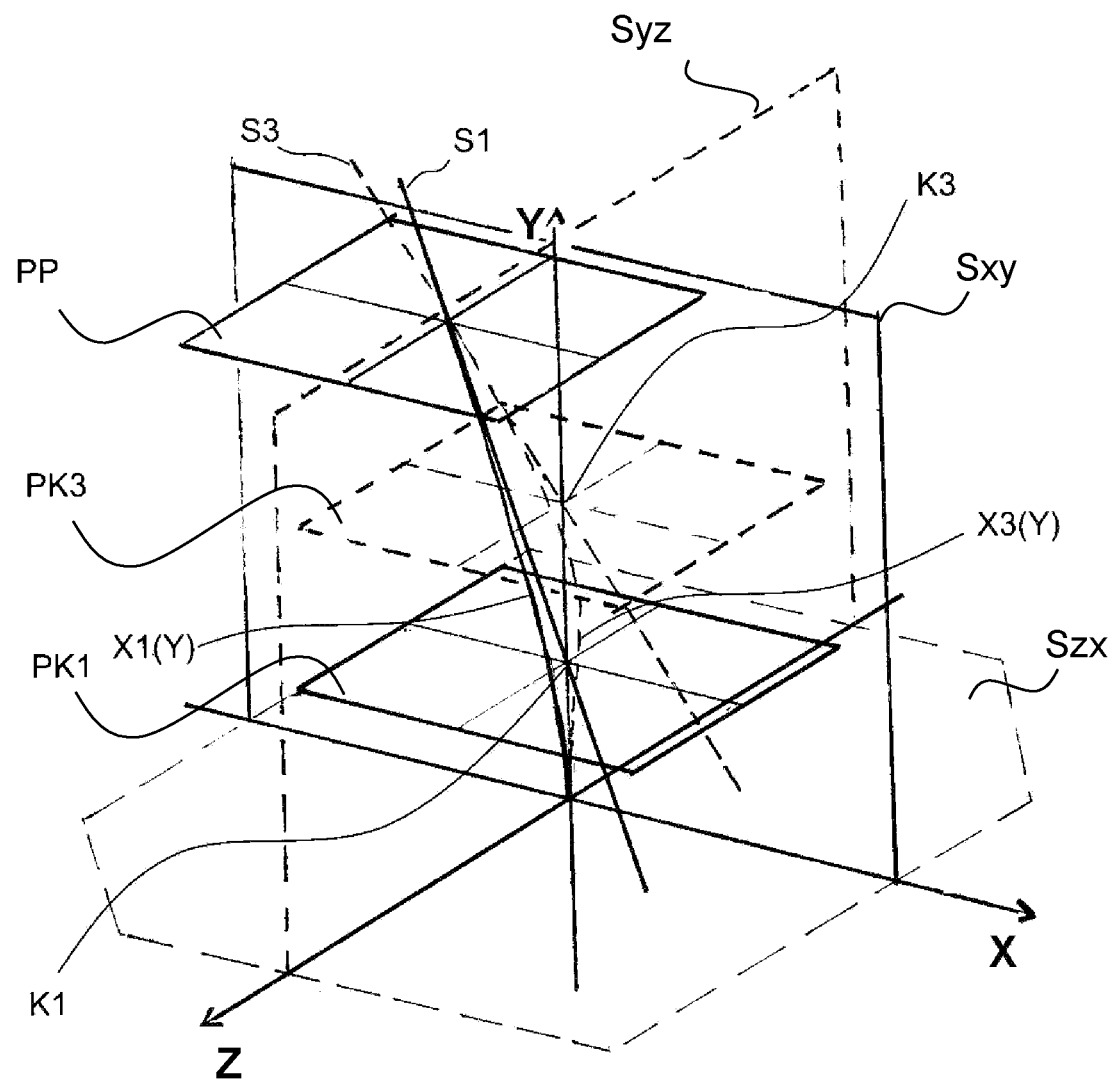
FIG. 5 shows a coordinate system to illustrate geometric elements referred to in the description of the invention.

In FIG. 3b and FIG. 5, the lines $X1(y)$ and $X3(y)$ show the orthogonal projections of the height dependent amplitudes of the measuring tube centerline of a measuring tube in the first and second mirror symmetric bending oscillation modes on the measuring tube transverse plane Sxy, wherein the amplitudes in the peak of the measuring tube centerline are normalized to 1. The considered measuring tube has, measured from the inner couplers, an arc height h=0.4 m and inner couplers at y=0.1 m. Furthermore, the graph shows peak secants S1, S3, which extend through points on the surface of the measuring tube, which lie in the resting position of the measuring tube on the line of intersection of the measuring tube longitudinal plane Syz and the measuring tube transverse plane Sxy. These peak secants S1, S3 are of interest when an exciter is affixed mechanically on the measuring tube in the measuring tube transverse plane Sxy and so has a deflection, which depends not only on the deflection of the measuring tube centerline but also on the torsion of the measuring tube in the measuring tube transverse plane Sxy. Therefore, the expected deflection of an exciter as a function of its mounting separation from the measuring tube centerline is to be found on the peak secant S1, S3. In FIG. 3b and FIG. 5, K1 and K3 designate positions of oscillation nodes, in which an exciter in the first and second mirror symmetric bending oscillation modes, respectively, would experience practically no deflection. The exciter is thus to be arranged spaced from these positions. As shown in FIG. 5, these positions define node planes PK1 and PK3, respectively. FIG. 5 further shows a peak plane, which extends perpendicularly to the measuring tube transverse plane Sxy and perpendicularly to the measuring tube longitudinal plane Syz and through the intersection between the measuring tube centerline and the measuring tube transverse Sxy plane.

Figure 4A:
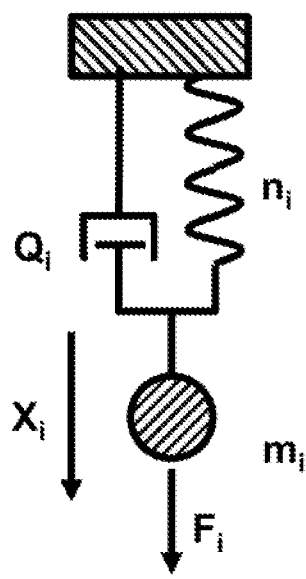
FIG. 4a shows a schematic model for description of an oscillator.
Figure 4B:
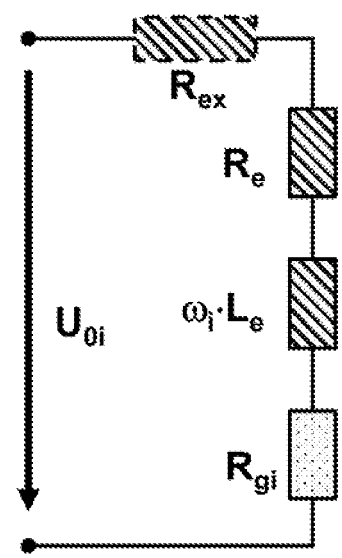
FIG. 4b shows a schematic diagram of the effective resistances or reactances in an exciter circuit.

Other considerations for arrangement of the electrodynamic exciter will now be explained based on FIGS. 4a and 4b.

The measuring tube, or the measuring tubes, of an oscillator are excited to oscillate in bending oscillation modes by a force F, which is composed of a sum of modal forces Fi, which are given by the product of the modal contribution $I_i$ to the exciter current I and a constant e, thus $$F_i = I_i \cdot e \quad (1)$$

On the other hand, the oscillating oscillator induces in the exciter an induced voltage $U_{gi}$, whose amplitude is given by the expression $$U_{gi} = \overline{X}_i \cdot e \quad (2),$$

wherein e in (1) and (2) is the same constant dependent on the inductance of the exciter.

The amplitude Xi of the i-th bending oscillation mode at the considered site, for example, in the measuring tube transverse plane, depends on the oscillating mass $m_i$, the resilience $n_i$, and the quality $Q_i$ of the oscillator in a particular oscillatory mode.

In the case of excitation with the resonance circuit frequency oi, the amplitude of the deflection is:

$$X_i = n_i \cdot Q_i \cdot F_i \quad (3).$$

The velocity is:

$$\overline{X}_i = \omega_i \cdot n_i \cdot Q_i \cdot F_i \quad (4).$$

For the induced voltage $U_{gi}$ there follows then with (1) and (2)

$$U_{gi} = e^2 \cdot \omega_i \cdot n_i \cdot Q_i \cdot I_i \quad (5),$$

or $$U_{gi} = R_{gi} \cdot I_i \quad (6),$$

wherein $R_{gi}$ is the mutual induction reactance.

$$R_i = e^2 \cdot \omega_i \cdot n_i \cdot Q_i \quad (7),$$

The electrical induction power $P_i$ is given by the product of the induced voltage $U_{gi}$ and the electrical current $I_i$, or by the product of the induction reactance $R_{gi}$ and the square of the electrical current $I_i$. The electrical current is given by I=U/R, wherein R is the total resistance of the exciter circuit, also referred to as exciter loop 200, shown in FIG. 4b, which includes in series the ohmic resistance $R_e$ of the exciter, the inductive reactance $\omega_i \cdot L_e$ of the exciter and the mutual induction reactance of the exciter $R_{gi}$. Additionally, a protective resistance element $R_{ex}$ can be provided for meeting an ignition protection type. When one takes into consideration that the inductive reactance $\omega \cdot L_e$ of the exciter is significantly less than the ohmic resistances, the following holds for the electrical excitation power:

$$P_i = U_0^2 \cdot \frac{R_{gi}}{(R_{ex} + R_e + R_{gi})^2}. \quad (8)$$

This expression is maximum, when the mutual induction reactance $R_{gi}$ equals the ohmic resistance $R_\Omega$ of the exciter conductor loop, thus equals the sum of the ohmic resistance $R_e$ of the exciter and the resistance of the, in given cases present, protective resistance element $R_{ex}$, thus $R_{gi} = R_\Omega = R_{ex} + R_e$. It is helpful to define a dimensionless power factor $pc_i$ for the different bending oscillation modes for describing this situation:

$$pc_i = \frac{4 \cdot R_\Omega \cdot R_{gi}}{(R_\Omega + R_{gi})^2} \quad (9)$$

This power value assumes the maximum value $pc_i = 1$, when $R_{gi} = R_\Omega$.

For developing a measuring transducer, the above equations offer an approach for checking $R_{gi}$ via the resilience ni, which for the electrodynamic exciter depends on its position in the measuring tube transverse plane. In this way, the power factors of a measuring transducer can be established for the different modes. For a given measuring tube, the mode dependent amplitudes, velocities, forces and eigenfrequencies are ascertained, for example, by simulation, and experimentally checked. The quality Qi for an oscillatory mode is measurable via the breadth of a resonance, or via the decay behavior of an oscillation. Finally, the induced voltage in the case of a freely oscillating measuring tube can be determined experimentally for verifying calculated variables.

FIG. 3b shows the power factors $pc_1$ and $pc_3$ for the first and second mirror symmetric bending oscillation modes as well as their product $pc_{1,3}$ as a function of the position of the exciter. At the nodes K1 and K2 along the peak secants, the power factors assume the value 0, as expected. Furthermore, it is shown that an arbitrarily increased amplitude $X_i$, to which the resilience $n_i$ is proportional, does not lead to an unlimited increasing of the power factor. In the present case, the maximum of $pc_3$ as well as the maximum M1.3 of $pc_{1,3}$ lie scarcely above the measuring tube curve. The electrodynamic exciter mechanism is mounted in FIG. 1 in this position.

As a result, the present invention provides the bases for using optimized power factors to obtain a measuring transducer with efficient excitation.

The invention claimed is:

1. A vibration-type measuring transducer, comprising:
a support body;
at least one curved measuring tube for guiding a medium and having an inlet side end section and an outlet side end section, wherein the measuring tube is held by the support body at the inlet side end section and at the outlet side end section, wherein the measuring tube has a freely oscillatable section;
an operating circuit;
an electrodynamic exciter in an exciter conductor loop for exciting bending oscillations of the measuring tube; and
at least one sensor for registering oscillations of the measuring tube;
wherein a measuring tube longitudinal plane is defined as a plane in which an integral along a measuring tube centerline of the oscillatable section of a squared distance of separations between the measuring tube centerline in a resting position of the measuring tube and the plane has a minimum value;
wherein a measuring tube transverse plane extends perpendicularly to the measuring tube longitudinal plane, and wherein the measuring tube is mirror symmetric to the measuring tube transverse plane;
wherein the measuring tube has a first bending oscillation mode that is mirror symmetric to the measuring tube transverse plane and that has a first eigenfrequency that depends on a density of the medium guided through the measuring tube;

wherein the measuring tube has a second bending oscillation mode that is mirror symmetric to the measuring tube transverse plane and that has a second eigenfrequency that depends on the density of the medium guided through the measuring tube;

wherein the second eigenfrequency is greater than the first eigenfrequency;

wherein the measuring tube has a peak secant that intersects points of an outer surface of a measuring tube wall that in the resting position of the measuring tube lie on a line of intersection between the measuring tube longitudinal plane and the measuring tube transverse plane, and wherein the peak secant has an oscillation node when the measuring tube oscillates in the second bending oscillation mode;

wherein the operating circuit is adapted to drive the exciter conductor loop with a signal for exciting the second bending oscillation mode;

wherein the exciter conductor loop has an ohmic resistance $R_\Omega$ and a mutual induction reactance $R_{g3}$ that depend on a position of the exciter; and wherein the exciter is positioned such that a dimensionless power factor $$pc_3 = \frac{4 \cdot R_\Omega \cdot R_{g3}}{(R_\Omega + R_{g3})^2}$$

has a value that is not less than 0.2 when the measuring tube is filled with water and is excited by the electrodynamic exciter with the eigenfrequency of the second bending oscillation mode to excite bending oscillations at a temperature of 300 K.

2. The vibration-type measuring transducer of claim 1, wherein the oscillation node of the peak secant in the second bending oscillation mode defines a node plane, wherein the node plane extends perpendicularly to the measuring tube transverse plane and perpendicularly to the measuring tube longitudinal plane, wherein the peak secant has no oscillation nodes in the node plane in the first bending oscillation mode.

3. The vibration-type measuring transducer of claim 1, wherein the measuring tube has an outer diameter in the measuring tube transverse plane, wherein a node plane is spaced from the intersection between the measuring tube centerline and the measuring tube transverse plane by no more than three outer diameters.

4. The vibration-type measuring transducer of claim 3, wherein a peak plane, which extends perpendicularly to the measuring tube transverse plane and perpendicularly to the measuring tube longitudinal plane and through the intersection between the measuring tube centerline and the measuring tube transverse plane, extends between the node plane and the electrodynamic exciter.

5. The vibration-type measuring transducer of claim 4, wherein the electrodynamic exciter is spaced from the peak plane by no more than two outer diameters of the measuring tube.

6. The vibration-type measuring transducer of claim 5, wherein the electrodynamic exciter is spaced from the peak plane by no more than one outer diameter.

7. The vibration-type measuring transducer of claim 3, wherein the node plane is spaced from the intersection between the measuring tube centerline and the measuring tube transverse plane by no more than two outer diameters.

8. The vibration-type measuring transducer of claim 1, wherein the operating circuit is adapted to drive the exciter conductor loop with a signal for exciting the first bending oscillation mode.

9. The vibration-type measuring transducer of claim 8, wherein the exciter conductor loop has a mutual induction reactance $R_{g1}$ dependent on the first bending oscillation mode, which mutual induction reactance $R_{g1}$ depends on the position of the exciter, wherein the exciter is positioned such that a dimensionless power factor $$pc_1 = \frac{4 \cdot R_\Omega \cdot R_{g1}}{(R_\Omega + R_{g1})^2}$$

has a value that is not less than 0.3 when the measuring tube is filled with water and excited by the electrodynamic exciter with the eigenfrequency of the first bending oscillation mode to execute bending oscillations at a temperature of 300 K.

10. The vibration-type measuring transducer of claim 9, wherein a total power factor $$pc_{1,3} = pc_1 \cdot pc_3$$

is not less than 0.2.

11. The vibration-type measuring transducer of claim 10, wherein the total power factor $pc_{1,3}$ is not less than 0.2.

12. The vibration-type measuring transducer of claim 10, wherein the total power factor $pc_{1,3}$ is not less than 0.7.

13. The vibration-type measuring transducer of claim 9, wherein the exciter is positioned such that the value of the dimensionless power factor $pc_1$ is not less than 0.8.

14. The vibration-type measuring transducer of claim 1, wherein the ohmic resistance $R_\Omega$ is at least 90% caused by a coil or a plurality of coils of the exciter, a limiting resistance, or a plurality of limiting resistances.

15. The vibration-type measuring transducer of claim 1, wherein the at least one measuring tube comprises at least one pair of measuring tubes having a shared measuring tube transverse plane, wherein the electrodynamic exciter is adapted to excite oscillation of the measuring tubes relative to one another.

16. The vibration-type measuring transducer of claim 15, wherein the measuring tubes have parallel measuring tube longitudinal planes.

17. The vibration-type measuring transducer of claim 1, wherein the at least one sensor comprises a pair of sensors for registering oscillations of the measuring tube, wherein the pair of sensors are arranged symmetrically to the measuring tube transverse plane.

18. The vibration-type measuring transducer of claim 1, wherein the exciter is positioned such that the value of the dimensionless power factor $pc_3$ is not less than 0.8.

19. The vibration-type measuring transducer of claim 1, wherein the ohmic resistance $R_\Omega$ is at least 90% caused by a coil or a plurality of coils of the exciter.

* * * * *